United States Patent
Hentschel et al.

(10) Patent No.: US 12,007,871 B2
(45) Date of Patent: Jun. 11, 2024

(54) COMPUTER-IMPLEMENTED METHOD FOR DETERMINING AT LEAST ONE QUALITY ATTRIBUTE FOR AT LEAST ONE DEFECT OF INTEREST

(71) Applicant: Siemens Aktiengesellschaft, Munich (DE)

(72) Inventors: Anja Hentschel, Munich (DE); Beatriz Llamazares Gallego, Gilching (DE); Matthias Saft, Olching (DE)

(73) Assignee: Siemens Aktiengesellschaft, Munich (DE)

( * ) Notice: Subject to any disclaimer, the term of this patent is extended or adjusted under 35 U.S.C. 154(b) by 129 days.

(21) Appl. No.: 17/666,815

(22) Filed: Feb. 8, 2022

(65) Prior Publication Data
US 2022/0261332 A1 Aug. 18, 2022

(30) Foreign Application Priority Data

Feb. 15, 2021 (EP) ..................................... 21157041

(51) Int. Cl.
*G06F 11/00* (2006.01)
*G06F 11/36* (2006.01)
*G06N 20/00* (2019.01)

(52) U.S. Cl.
CPC ...... *G06F 11/3604* (2013.01); *G06F 11/3664* (2013.01); *G06F 11/3672* (2013.01); *G06N 20/00* (2019.01)

(58) Field of Classification Search
CPC ............. G06F 11/3604; G06F 11/3664; G06F 11/3672; G06F 11/3608; G06F 11/3013; G06F 11/302; G06F 11/2257; G06F 11/2263; G06F 11/3447; G06N 20/00
See application file for complete search history.

(56) References Cited

U.S. PATENT DOCUMENTS

| | | | |
|---|---|---|---|
| 10,902,579 B1 * | 1/2021 | Soltanmohammadi | G06F 18/2431 |
| 2014/0245254 A1 * | 8/2014 | Padmalata | G06Q 10/00 717/104 |
| 2016/0189055 A1 | 6/2016 | Zvitia | |
| 2017/0082555 A1 * | 3/2017 | He | G06N 20/20 |
| 2018/0307904 A1 | 10/2018 | Patil | |
| 2020/0241861 A1 * | 7/2020 | Zhang | G06F 18/254 |

FOREIGN PATENT DOCUMENTS

| | | | |
|---|---|---|---|
| CN | 112015149 A | 1/2020 | |
| WO | WO-2020210947 A1 * | 10/2020 | G06F 11/362 |

* cited by examiner

*Primary Examiner* — Joseph D Manoskey
(74) *Attorney, Agent, or Firm* — Schmeiser, Olsen & Watts, LLP

(57) ABSTRACT

Provided is a computer-implemented method for determining at least one quality attribute for at least one defect of interest, including the steps: a. providing an input data set including the at least one defect of interest; b. determining the at least one quality attribute for the at least one defect of interest using a classification algorithm based on the input data set; and c. providing the determined at least one quality attribute and/or additional output information as output. Further, a computing unit and a computer program product are provided.

9 Claims, 2 Drawing Sheets

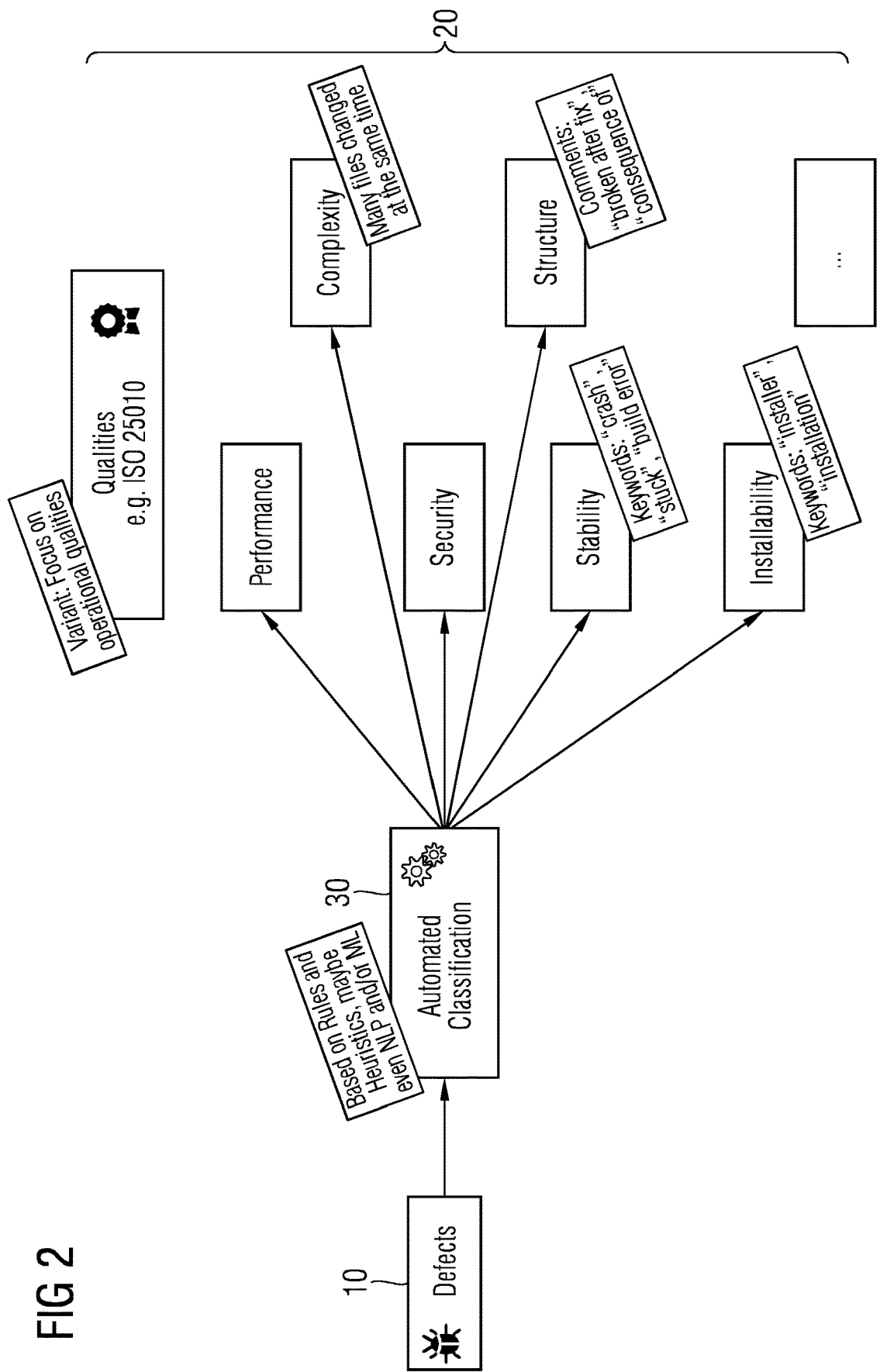

Figure 1:
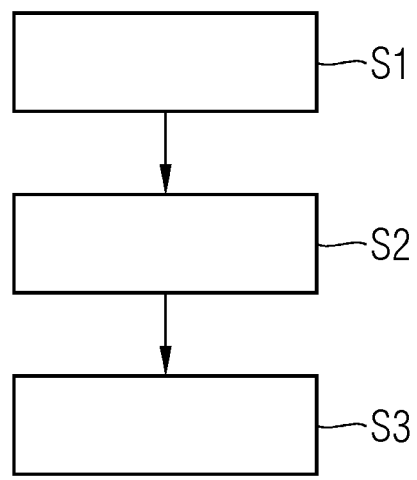

COMPUTER-IMPLEMENTED METHOD FOR DETERMINING AT LEAST ONE QUALITY ATTRIBUTE FOR AT LEAST ONE DEFECT OF INTEREST

CROSS REFERENCE TO RELATED APPLICATIONS

This application claims priority to EP Application No. 21157041.1, having a filing date of Feb. 15, 2022, the entire contents of which are hereby incorporated by reference.

FIELD OF TECHNOLOGY

The following relates to a computer-implemented method for determining at least one quality attribute for at least one defect of interest. Further, the following relates to a corresponding computing unit and a corresponding computer program product.

BACKGROUND

Currently there is a trend of digitalization in the industry domain. Hence, e.g., a manufacturing process for a product may be digitally controlled. For describing several facets of this trend the term "Industry 4.0" (in German: "Industrie 4.0") is a commonly used term. It has become not only a major part of today's industry, but it also drives the business in many industrial domains.

Considering complex industrial plants, the industrial plants usually comprise distinct parts, modules or units with a multiplicity of individual functions. Exemplary units include sensors and actuators. The units and functions have to be controlled and regulated in an interacting manner. They are often monitored, controlled and regulated by automation systems. The units can either exchange data directly with one another or communicate via a bus system.

The increasing degree of digitalization allows for manufacturing or industrial installation of products in a production line of the industrial plant to be performed by robot units or other autonomous units in an automatic manner and thus efficiently at least in part up to now.

However, the risk (likelihood of occurrence and impact) of defects is immense. A defect is the common term used to describe an error, flaw, mistake, failure or fault in a computer program or system that produces an incorrect or unexpected result or causes it to behave in unintended ways, see also further below. The defects often have serious effects on the underlying technical system, such as the industrial plant and associated unit. The same applies to autonomous cars and other autonomous units.

Thereby, the defect often has a negative impact on the industrial plant or its control unit e.g., storage programmable control ("SPC"). This defect can cause a malfunction or fall out of the robot unit in the manufacturing process, thus resulting in downtimes of the industrial plant and tremendous costs. The same applies to other technical systems as the autonomous car. A software bug in the controlling system or controlling software of the autonomous car as defect can have a severe impact on the behavior of the autonomous car. In the worst case, the human-machine interaction is affected leading to personal injuries.

According to conventional art experts or a team of experts in a project decide about the classification of a defect, e.g., in a change control board or during a bug triage manually. The decision is based on the description of the defect in a defect tracking system. Hence, the properties that characterize a defect are project specific.

Typically, defects are classified according to
Urgency/Priority
Impact/Severity and/or
Component in which the defect occurred The Orthogonal Defect classification ("ODC") is known from the conventional art as such a manual classification method. The ODC focuses on the trigger of a defect and does not consider any quality attributes.

An aspect relates to provide a computer-implemented method for determining at least one quality attribute for at least one defect of interest in an efficient and reliable manner.

SUMMARY

This problem is according to one aspect of embodiments of the invention solved by a computer-implemented method for determining at least one quality attribute for at least one defect of interest, comprising the steps:
 a. Providing an input data set comprising the at least one defect of interest;
 b. Determining the at least one quality attribute for the at least one defect of interest using a classification algorithm based on the input data set; and
 c. Providing the determined at least one quality attribute and/or additional output information as output.

Accordingly, embodiments of the invention are directed to a computer-implemented method for determining at least one quality attribute of a product that is affected by at least one defect of interest. In other words, the defect of interest is classified by assignment of the one or more quality attributes to the defect of interest.

Thereby, the defect of interest to be classified is a software- or hardware defect, according to which any malfunction, error, bug or unexpected behavior. In other words, the defect describes any variance, deviation or discrepancies between actual and expected results of the software or hardware. Thus, accordingly, the software defect e.g., affects the software running on a computing unit or underlying technical system.

Thereby, the quality attribute is any attribute, feature, condition or requirement in the usual sense of the word, reflecting the quality of the software or hardware. Accordingly, exemplary Software Quality Attributes are: Correctness, Reliability, Adequacy, Learnability, Robustness, Maintainability, Readability, Extensibility, Testability, Efficiency, Portability, see also further below.

In the first step, the input data set is provided. The input data set comprises the at least one defect of interest to be classified. Accordingly, one or more defects can be used as input, e.g., a plurality of defects is desired as input for Machine learning. The defect of interest can be extended with associated defect information. Additional data increases the performance, correctness, reliability and trustworthiness of the classification. In other words, any available information about the defect, in form of a defect description can be used as input for classification.

This input data set can be received via one or more interfaces of a receiving unit e.g., from a volatile or non-volatile data storage unit, including databases and cloud computing. Alternatively, in an embodiment, the input data set can be provided by a defect management system such as ClearQuest or JIRA. The output data of the method in the last step can be transmitted or sent via one or more interfaces of a transmitting unit, e.g., to a computing unit for further processing.

In the next step, the one or more quality attributes are determined for the at least one defect of interest by means of classification. The received input data set is used as input for the classification.

In the last step, the determined one or more quality attributes are outputted. The output data can be extended with further data, e.g., data justifying the classification.

Hence, the method according to embodiments of the invention allows to enhance the quality evaluation of the system under development in an efficient and reliable manner.

Moreover, the extended defect description, in other words the at least one determined quality attribute, increases the efficiency of the development by Speeding up the defect triage
Improving to spend the resources for defect fixing on the most important defects and
Identifying quality attributes with a higher need for specific quality measures to prevent the occurrence of high-risk defects.

In one aspect, the at least one quality attribute corresponds to the ISO 25010 standard. Accordingly, the quality attribute meets the ISO 25010 standard, any other standard or classification. The standard can be flexibly selected depending on the user requirement, the use case, the underlying system and especially domain such as Software, Hardware and Safety. The advantage of the application of an ISO standard is that the determined quality attribute is standardized and hence allows for accurate or more concrete conclusions. The ISO 25010 standard is used for the domain Software.

In another aspect, the input data set is defined as defect description, in textual format and/or stored in a computer-readable volatile or non-volatile storage medium. Accordingly, the input data set is inputted as defect description. The defect description can be designed as table or in a table structure with rows and columns. Each defect of a plurality of defects is listed in a row with its corresponding features or additional related defect information in the column, accordingly M rows, wherein M is the number of defects and N columns, wherein N is the number of features.

Exemplary features are listed in the following:
Summary/Title/Headline: The summary can comprise a short description of the defect.
Extended description: The extended description can comprise the circumstances under which the defect occurred and details on its appearance.
Detected when and by whom
Component: The component is the part or unit of the software/hardware where the defect has been found or which is probably causing the defect.
Severity/Priority
Version of the software
State (in the context of the defect handling process)
Comments: discussion of the defect by stakeholders Therefore, any change management software e.g., the aforementioned defect management system ClearQuest, relational databases, Excel sheets, XML, or other structured text files can be used for the defect description.

In another aspect, the classification algorithm is a machine learning algorithm or rule-based.

Accordingly, any classification algorithm can be used for classifying the defect of interest in a flexible manner depending on the user requirements, the use case and underlying technical system.

In another aspect, the method further comprises the step initiating at least one action depending on the determined at least one quality attribute and/or related output information, wherein the related output information is information associated with the at least one defect of interest, associated defect information or the at least one determined quality attribute.

In another aspect, the at least one action is an action selected form the group comprising:
Processing the at least one determined quality attribute;
Prioritizing the at least one defect of interest to be resolved;
The importance of the determined quality attribute for the end product depends on the purpose of the product and the context it is used in. The classification of the defect allows to spend the available resources for the defect resolution on the most important ones, resulting in a higher overall quality of the product.
Identifying the need or urgency for fast resolution or urgency; and
If the defect effects specific quality attributes like e.g., Safety or Security, the defect resolution must be started as soon as possible. The automated classification allows to identify those defects and trigger the resolution process, thus leading to shorter down times.
Identifying gaps in the quality assurance process.
The Analysis of the outputted set of defects with their effected quality attributes allows to identify gaps in the quality assurance approach. If the output contains a high percentage of defects effecting the same quality attribute, e.g., performance, the corresponding quality assurance measures must be enhanced which leads to a higher quality of the product.

Accordingly, the input data, data of intermediate method steps and/or resulting output data can be further handled. The output data is in particular the determined quality attribute. One or more actions can be performed. The action can be equally referred to as measure.

These actions can be performed by one or more technical units, such as computing unit or robot unit. The actions can be performed gradually or simultaneously. Actions can include e.g. storing and processing steps. The advantage is that appropriate actions can be performed in a timely manner.

A further aspect of embodiments of the invention is a computing unit e.g., robot unit or another autonomous unit for performing the aforementioned method steps.

The unit may be realized as any devices, or any means, for computing, in particular for executing a software, an app, or an algorithm. For example, the unit may consist of or comprise a central processing unit (CPU) and/or a memory operatively connected to the CPU. The unit may also comprise an array of CPUs, an array of graphical processing units (GPUs), at least one application-specific integrated circuit (ASIC), at least one field-programmable gate array (FPGA), or any combination of the foregoing. The unit may comprise at least one module which in turn may comprise software and/or hardware. Some, or even all, modules of the unit may be implemented on a cloud computing platform.

BRIEF DESCRIPTION

Some of the embodiments will be described in detail, with reference to the following figures, wherein like designations denote like members, wherein:

FIG. 1 shows a schematic diagram of the method according to an embodiment of the invention; and FIG. 2 shows a schematic representation of the classification according to an embodiment of the invention.

DETAILED DESCRIPTION

FIG. 1 illustrates a flowchart of the method according to embodiments of the invention with the method steps S1 to S3.

In the first step S1 the input data set is received or provided as input for the subsequent method steps S2 to S3. Thereby, the input data set comprises the at least one defect of interest 10. Additionally, the input data can comprise further data, namely associated defect information.

According to an embodiment, the input data set is provided as defect description, according to which, content of different properties or features of a defect description. This defect description can be provided as textual information like the title, detailed description, comments, as well as numerical information as the number of files changed for a fixed defect.

In the next method step S2, the at least one quality attribute 20 for the at least one defect of interest 10 is determined by means of a classification algorithm 30 on the basis of the received input data set. Therefore, heuristics and keywords, natural language processing or machine learning can be used for the classification task in step S2.

In the last method step S3, the determined at least one quality attribute 20 and/or additional output information is outputted or provided as output. This output can be further handled or processed.

In other words, the method according to embodiments of the invention enhances defect descriptions by classifying them regarding quality attributes based on the provided defect description.

FIG. 2 shows a schematic representation of the classification according to an embodiment of embodiments of the invention. The defects 10 are fed as input into the classification algorithm 30. After classification of the defects 10, the resulting one or more quality attributes 20 are provided as output. Exemplary quality attributes are listed in FIG. 2. According to an embodiment, the resulting quality attribute meets the ISO standard 25010.

Use Case 1
Context: Software for grid control (distribution of energy), e.g., monitoring, analyzing and preventing outages, planning changes of the system configuration
Input: defect (software malfunction)
Output: classification of the defect corresponds to the quality, which is affected, e.g. a defect which results in a system crash affects the reliability of the software: defect=crash/class=reliability
Action: class reliability has highest priority=>in consequence the defect has highest priority
Benefit: high priority defects can be detected and fixed fast which increases the overall quality of the product and the customer satisfaction Use Case 2
Context: Software for grid control (distribution of energy), e.g., monitoring, analyzing and preventing outages, planning changes of the system configuration
Input: set of defects (software malfunction)
Output: classification of all defects in the set corresponding to the qualities which are affected, identifying e.g., high percentage of defects affecting the same class, like security
Action: architectural measures to address the root cause of the defects in the design of the software
Benefit: minimize risk of further defects related to this quality, in the example security Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE SIGNS 10 defect of interest
30 classification algorithm
20 quality attribute
S1 to S3 Method steps 1 to 3

The invention claimed is:

1. A computer-implemented method implemented by a processor for determining at least one quality attribute for at least one defect of interest, comprising the steps:
 a. providing an input data set comprising the at least one defect of interest;
 b. determining the at least one quality attribute for the at least one defect of interest using a classification algorithm based on the input data set; and
 c. providing the determined at least one quality attribute and/or additional output information as output, wherein said quality attribute of the software are: correctness, reliability, adequacy, learnability, robustness, maintainability, readability, extensibility, testability, efficiency, and portability,
 d. in response to determining the quality attribute triggering of the resolution process.

2. The computer-implemented method according to claim 1, wherein the at least one quality attribute corresponds to the ISO 25010 standard.

3. The computer-implemented method according to claim 1, wherein the input data set is defined as defect description, in textual format and/or stored in a computer-readable volatile or non-volatile storage medium.

4. The computer-implemented method according to claim 3, wherein the classification algorithm is a machine learning algorithm or rule-based.

5. The computer-implemented method according to claim 1, wherein the method further comprises the step
 initiating at least one action depending on the determined at least one quality attribute and/or related output information, wherein the related output information is information associated with the at least one defect of interest, associated defect information or the at least one determined quality attribute.

6. The computer-implemented method according to claim 5, wherein the at least one action is an action selected from the group comprising:
 processing the at least one determined quality attribute;
 prioritizing the at least one defect of interest to be resolved;
 identifying a need or urgency for fast resolution or urgency; and
 identifying at least one gap in a quality assurance process.

7. The computing unit comprising:
 a processor and a memory coupled to the processor, wherein the processor is configured to: steps of method according to claim 1.

8. A computer program product, comprising a computer readable hardware storage device having computer readable program code stored therein, said program code executable by a processor of a computer system to implement a method directly loadable into an internal memory of a computer, comprising software code portions for performing the steps according to claim 1 when the computer program product is running on a computer.

9. The computer-implemented method in claim 1, wherein the defects are classified based on:
   urgency, priority, impact, severity, and component in which the defect occurred.

\* \* \* \* \*